United States Patent
Choi et al.

(10) Patent No.: US 8,268,192 B2
(45) Date of Patent: Sep. 18, 2012

(54) BLUE PHOSPHOR, DISPLAY DEVICE INCLUDING THE SAME, AND ASSOCIATED METHODS

(75) Inventors: Ick-Kyu Choi, Suwon-si (KR); Yoon-Chang Kim, Suwon-si (KR); Do-Hyung Park, Suwon-si (KR); Mi-Ran Song, Suwon-si (KR); Hyun-Deok Lee, Suwon-si (KR); Ji-Hyun Kim, Suwon-si (KR); Yu-Mi Song, Suwon-si (KR); Jay-Hyok Song, Suwon-si (KR); Young-Hun Lee, Suwon-si (KR); Min-Ju Kim, Suwon-si (KR); Jin-Hyoung Seo, Suwon-si (KR); Young-Ki Kim, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 525 days.

(21) Appl. No.: 12/461,098

(22) Filed: Jul. 31, 2009

(65) Prior Publication Data
US 2010/0044634 A1    Feb. 25, 2010

(30) Foreign Application Priority Data
Aug. 19, 2008   (KR) .................. 10-2008-0081068

(51) Int. Cl.
*C09K 11/55*    (2006.01)
*C09K 11/64*    (2006.01)

(52) U.S. Cl. ................. 252/301.4 R; 313/582; 313/584; 313/486

(58) Field of Classification Search .......... 252/301.4 R; 313/582, 584, 486
See application file for complete search history.

(56) References Cited

U.S. PATENT DOCUMENTS
2002/0039665 A1   4/2002   Do et al.
2006/0238101 A1   10/2006   Choi et al.

FOREIGN PATENT DOCUMENTS
JP   2004-067860   *   3/2004
JP   2004-067860 A    3/2004
KR   10-2002-0072139 A   9/2002

OTHER PUBLICATIONS
European Search Report in EP 09252020.4-1218/2157152, dated Jul. 21, 2011 (Choi, et al.).

* cited by examiner

*Primary Examiner* — Carol M Koslow
(74) *Attorney, Agent, or Firm* — Lee & Morse, P.C.

(57) ABSTRACT

A blue phosphor, a display device including the same, and associated methods, the blue phosphor including $BaMgAl_{10}O_{17}$:Eu (BAM) phosphor particles having a surface component and an internal component, wherein an aluminum/barium (Al/Ba) molar ratio of the surface component of the phosphor particles is 1.1 to about 1.4 times the Al/Ba molar ratio of the internal component of the phosphor particles, and the Al/Ba molar ratios are continuously variable between the internal component and the surface component.

16 Claims, 6 Drawing Sheets

FIG. 7

Table 1: Molar ratios, Efficiency, and Durability.

| | Molar Ratio of Al Compound in First Process | Molar Ratio of Al Compound in Second Process | Al/Ba Molar Ratio of Surface Component | Al/Ba Molar Ratio of Internal Component | (Al/Ba Molar Ratio of Surface Component)/(Al/Ba Molar Ratio of Internal Component) | Relative Efficiency (%) | Durability (1,000 hours) |
|---|---|---|---|---|---|---|---|
| Example 1 | 10 | 0.4 | 13.43 | 11.11 | 1.21 | 105 | 94 % |
| Example 2 | 10 | 0.8 | 14.91 | 11.11 | 1.34 | 103 | 93 % |
| Comparative Example 1 | 10 | 0 | 11.12 | 11.11 | 1.00 | 100 | 81 % |
| Comparative Example 2 | 9.8 | 0.2 | 11.58 | 11.13 | 1.04 | 97 | 82 % |
| Comparative Example 3 | 9.6 | 0.4 | 11.85 | 11.10 | 1.07 | 97 | 83 % |
| Comparative Example 4 | - | 0.1 weight % Coating | 11.43 | 11.13 | 1.03 | 95 | 78 % |
| Comparative Example 5 | - | 0.2 weight % Coating | 12.35 | 11.14 | 1.11 | 90 | 81 % |
| Comparative Example 6 | - | 2 weight % Coating | 14.25 | 11.15 | 1.28 | 72 | 80 % |

BLUE PHOSPHOR, DISPLAY DEVICE INCLUDING THE SAME, AND ASSOCIATED METHODS

BACKGROUND

1. Field

Embodiments relate to a blue phosphor, a display device including the same, and associated methods.

2. Description of the Related Art

A phosphor is a material that receives light or high energy in the form of, e.g., electrons, so as to emit visible light. Such a phosphor is a core material that determines the quality of a lamp or a display device. A phosphor should have excellent light emission characteristics in order to be employed in a display device, e.g., a plasma display panel (PDP) using vacuum ultraviolet (VUV) rays, and should have excellent cathode ray emission characteristics in order to be employed in, e.g., a field emission display (FED) device. Phosphors may directly influence brightness and durability of the PDP and the FED device and may be useful in order to realize natural colors. Thus, the development of a phosphor having excellent light emission characteristics and excellent cathode ray emission characteristics may improve performance of a PDP and FED device.

A PDP emits light due to ultraviolet (UV) rays generated by a discharge of, e.g., a mixed gas of neon (Ne) and xenon (Xe), filled in an area between a pair of glass substrates. Thus, each phosphor may generate visual light due to resonance radiation light of a Xe ion (a VUV ray of 147 nm). The development of phosphors for PDPs has been in a direction toward improving cathode ray tube (CRT) phosphors or phosphor materials which have been used in phosphor application products such as fluorescent lamps, which have been used since PDPs were initially developed. In order to use a phosphor in a PDP, the phosphor should have excellent discharge characteristics, a high light emission luminance, excellent color coordinate characteristics and a short afterglow time, and should not deteriorate due to heat or UV rays.

SUMMARY

Embodiments are therefore directed to a blue phosphor, a display device including the same, and associated methods, which substantially overcome one or more of the problems due to the limitations and disadvantages of the related art.

It is therefore a feature of an embodiment to provide a blue phosphor which improves durability of a PDP and is stable during a thermal process of a PDP.

At least one of the above and other features and advantages may be realized by providing a blue phosphor including $BaMgAl_{10}O_{17}$:Eu (BAM) phosphor particles having a surface component and an internal component, wherein an aluminum/barium (Al/Ba) molar ratio of the surface component of the phosphor particles is 1.1 to about 1.4 times the Al/Ba molar ratio of the internal component of the phosphor particles, and the Al/Ba molar ratios are continuously variable between the internal component and the surface component.

The Al/Ba molar ratio of the surface component may be about 13:1 to about 16:1, and the Al/Ba molar ratio of the internal component may be about 11:1 to about 12:1.

The Al/Ba molar ratio of the surface component may be an average Al/Ba molar ratio of a section where a variation rate of an Al/Ba molar ratio according to a depth of the phosphor particle is about −0.01 to about 0.01, as determined from a surface toward a center of the phosphor particle, and the Al/Ba molar ratio of the internal component may be an average Al/Ba molar ratio of a section where the variation rate of the Al/Ba molar ratio according to the depth of the phosphor particle is about −0.01 to about 0.01, as determined from the center toward the surface of the phosphor particle.

At least one of the above and other features and advantages may also be realized by providing a display device including a phosphor layer including a blue phosphor including $BaMgAl_{10}O_{17}$:Eu (BAM) phosphor particles having a surface component and an internal component, wherein an aluminum/barium (Al/Ba) molar ratio of the surface component of the phosphor particles is 1.1 to about 1.4 times the Al/Ba molar ratio of the internal component of the phosphor particles, and the Al/Ba molar ratios are continuously variable between the internal component and the surface component.

At least one of the above and other features and advantages may also be realized by providing a method of forming a blue phosphor including performing a first thermal process on a mixture of a barium compound, a magnesium compound, a first aluminum compound, and a europium compound in an air atmosphere so as to form a basic phosphor material, adding a second aluminum compound to the basic phosphor material so as to form a basic phosphor material/aluminum compound adduct, and performing a second thermal process on the basic phosphor material/aluminum compound adduct in a reducing atmosphere so as to form phosphor particles having a surface component and an internal component, wherein an aluminum/barium (Al/Ba) molar ratio of the surface component of the phosphor particles is 1.1 to about 1.4 times the Al/Ba molar ratio of the internal component of the phosphor particles.

The barium compound may include at least one of barium carbonate ($BaCO_3$) and barium oxide (BaO).

The first and second aluminum compounds may include at least one of aluminum oxide ($Al_2O_3$) and aluminum nitrate ($Al(NO_3)_3$).

The europium compound may include at least one of europium oxide ($Eu_2O_3$), europium fluoride ($EuF_3$), and europium chloride ($EuCl_3$).

The mixture may have a barium:magnesium:aluminum:oxygen (Ba:Mg:Al:O) ratio of about 0.9-1.1:0.9-1.1:9-10:16-18, based on 0.1 mol of Eu.

The first thermal process may be performed at about 1350 to about 1450° C.

The first thermal process may be performed for about 1 to about 10 hours.

The second aluminum compound may be added in an amount of about 0.5 to about 2 weight parts, based on 100 weight parts of the basic phosphor material.

The second thermal process may be performed at about 1500 to about 1600° C.

The second thermal process may be performed for about 1 to about 10 hours.

The reducing atmosphere may include hydrogen gas and at least one of, nitrogen gas, helium gas, neon gas, and argon gas.

BRIEF DESCRIPTION OF THE DRAWINGS

The above and other features and advantages will become more apparent to those of ordinary skill in the art by describing in detail exemplary embodiments with reference to the attached drawings, in which:

FIG. 7 illustrates Table 1, showing compositions, durability, and efficiency of phosphors prepared according to Examples 1 and 2 and Comparative Examples 1 to 6.

DETAILED DESCRIPTION

Figure 1:
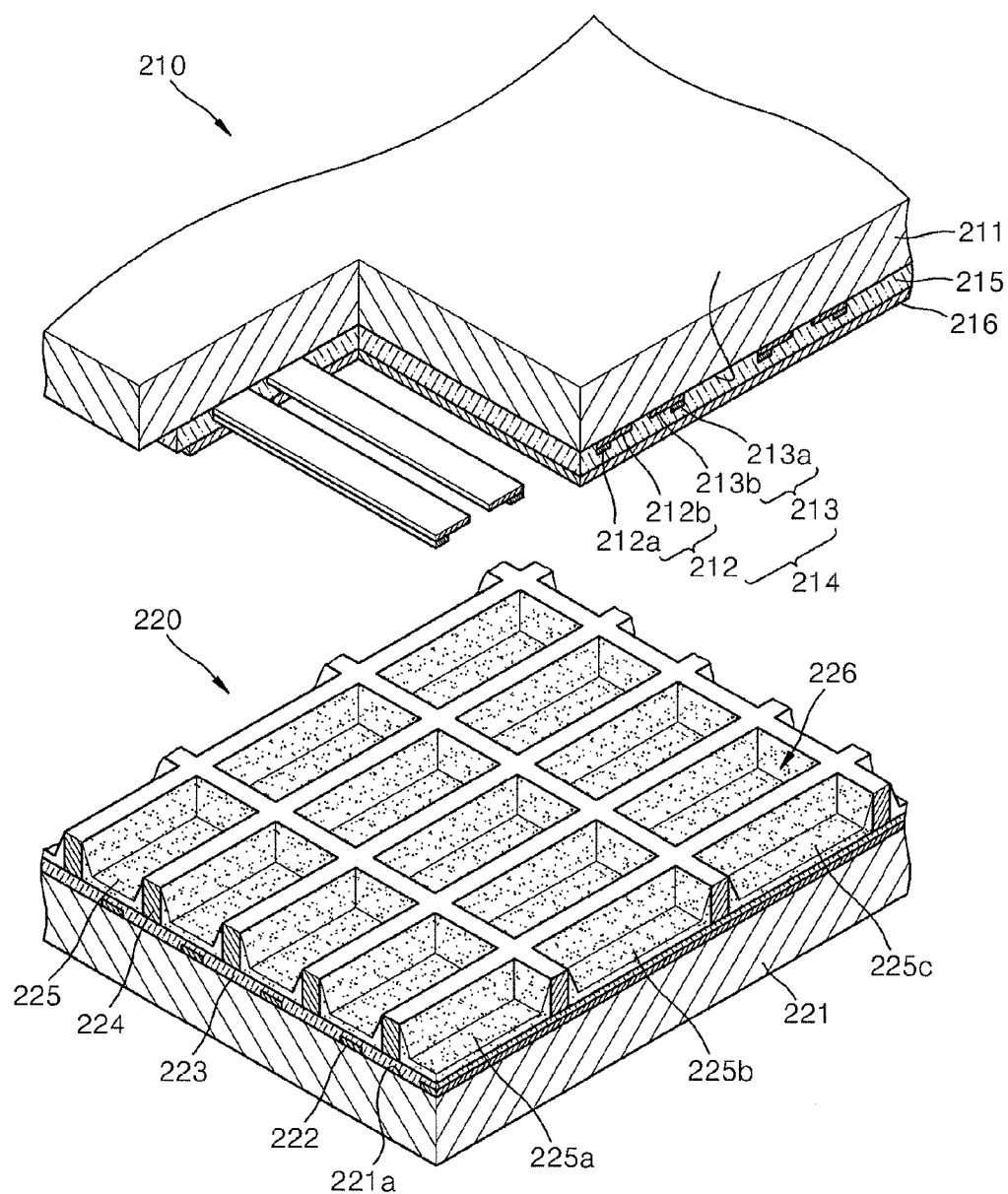
FIG. 1 illustrates a schematic perspective view of a plasma display panel (PDP) according to an embodiment.

Korean Patent Application No. 10-2008-0081068, filed on Aug. 19, 2008, in the Korean Intellectual Property Office, and entitled: "Blue BaMgAl$_{10}$O$_{17}$:Eu Phosphor for Plasma Display Panel and Plasma Display Panel Including Phosphor Layer Formed of Blue BaMgAl$_{10}$O$_{17}$:Eu Phosphor," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "a" and "an" are open terms that may be used in conjunction with singular items or with plural items. For example, the term "an aluminum compound" may represent a single compound, e.g., aluminum oxide, or multiple compounds in combination, e.g., aluminum oxide mixed with aluminum nitrate.

Embodiments provide a blue phosphor, a display device including the same, and associated methods. More particularly, embodiments provide a plasma display panel (PDP) including a phosphor layer formed of a blue BaMgAl$_{10}$O$_{17}$:Eu (BAM) phosphor of which surface and internal components of the BAM phosphor particle may have different aluminum/barium (Al/Ba) molar ratios. The phosphor may be formed by performing a first thermal process on a mixture of a barium (Ba) compound, a magnesium (Mg) compound, an aluminum (Al) compound and a europium (Eu) compound, in an air atmosphere so as to form a basic phosphor material. Then an Al compound may be added and a second thermal process may be performed on the basic phosphor material in a reducing atmosphere.

A typical blue BAM phosphor for a PDP may undergo an undesirable luminance reduction and color coordinate change during thermal processing of the PDP. The typical blue BAM phosphor may also undergo a luminance reduction and exhibit variation between PDPs due to instability caused by long time projection of vacuum ultraviolet (VUV) rays, thereby reducing durability of the PDP. The typical blue BAM phosphor may deteriorate due to VUV rays generated when discharge occurs and thus may greatly reduce an emission time of the typical blue BAM phosphor. A surface processing material, e.g., Al$_2$O$_3$ or Y$_2$O$_3$, may be used as a coating on the typical blue BAM phosphor in order to prevent the above problems.

The blue BAM phosphor according to an embodiment, a particle of which may have surface and internal components having different Al/Ba molar ratios such that the surface component contains a larger amount of Al than the internal component, may be stable during thermal processing of the PDP. The blue BAM phosphor of an embodiment may be formed by adding an Al compound, e.g., Al$_2$O$_3$, during a forming process of the blue BAM phosphor, instead of coating the Al compound after the blue BAM phosphor is completely formed, and thus the surface component may contain a larger amount of Al than the internal component, which is different from the typical blue BAM phosphor. A PDP including a phosphor layer formed of the blue BAM phosphor of an embodiment may have improved durability.

According to an embodiment, a blue BAM phosphor may be formed by thermally processing the mixture of the Ba compound, the Mg compound, the Al compound and the Eu compound. The ratio of Al to another element, e.g., barium, in the surface component of the particle may be greater than the ratio of Al to the other element in the internal component of the particle. In particular, an Al/Ba molar ratio of the surface component may be about 1.1 to about 1.4 times the Al/Ba molar ratio of the internal component. Maintaining the Al/Ba molar ratio of the surface component at about 1.1 times the Al/Ba molar ratio of the internal component or greater may help ensure that the durability of a PDP including the phosphor is improved. Maintaining the Al/Ba molar ratio at about 1.4 times the Al/Ba molar ratio of the internal component or less may help ensure that an emission efficiency of a PDP including the phosphor is not reduced. In particular, the Al/Ba molar ratio of the surface component may be about 13:1 to about 16:1 and the Al/Ba molar ratio of the internal component may be about 11:1 to about 12:1. The blue BAM phosphor having these Al/Ba molar ratios may have optimized stability during thermal processing of the PDP.

The Al/Ba molar ratio of the surface component may mean an average Al/Ba molar ratio of a section of a graph of the Al/Ba molar ratio versus the depth of the blue BAM phosphor where a variation rate of an Al/Ba molar ratio according to a depth of the blue BAM phosphor particle is about −0.01 to about 0.01, as determined from a surface toward a center of the blue BAM phosphor particle. The Al/Ba molar ratio of the internal component may mean an average Al/Ba molar ratio of a section of a graph of the Al/Ba molar ratio versus the depth of the blue BAM phosphor where the variation rate of the Al/Ba molar ratio according to the depth of the blue BAM phosphor is about −0.01 to about 0.01, as determined from the center toward the surface of the blue BAM phosphor. The Al/Ba molar ratio of the surface component and the Al/Ba molar ratio of the internal component will be described in detail below in connection with regions A-B and C-D, respectively, in FIG. 3.

A blue BAM phosphor forming method according to an embodiment will now be described. The blue BAM phosphor may be formed by performing a first thermal process on a mixture of a barium compound, a magnesium compound, an aluminum compound and a europium compound in an air atmosphere so as to form a basic phosphor material. Then, an aluminum compound is added and a second thermal process is performed on the basic phosphor material/aluminum compound adduct in a reducing atmosphere.

Here, the barium compound may include, e.g., $BaCO_3$, BaO, or mixtures thereof, the magnesium compound may include, e.g., MgO, $MgCO_3$, or mixtures thereof, the aluminum compound may include, e.g., $Al_2O_3$, $Al(NO_3)_3$, or mixtures thereof, and the europium compound may include, e.g., $Eu_2O_3$, $EuF_3$, $EuCl_3$, or mixtures thereof. However, the embodiments are not limited thereto.

When the first thermal process is performed, the mixture may have a barium:magnesium:aluminum:oxygen (Ba:Mg:Al:O) ratio of about 0.9-1.1:0.9-1.1:9-10:16-18, based on 0.1 mol of Eu. Thus, a BAM phosphor emitting blue light may be formed.

The first thermal process may be performed at about 1350 to about 1450° C. for about 1 hour to about 10 hours. After the first thermal process is performed, an Al compound may be added to the basic phosphor material, which does not have an ultimate lattice structure. Then, a second thermal process may be performed. Thus, when the Al compound is added and the second thermal process is performed, a portion of the added Al compound may penetrate into and be mixed with the basic phosphor material.

"The Al/Ba molar ratio of a surface component" and "the Al/Ba molar ratio of an internal component" will now be described.

Figure 2:
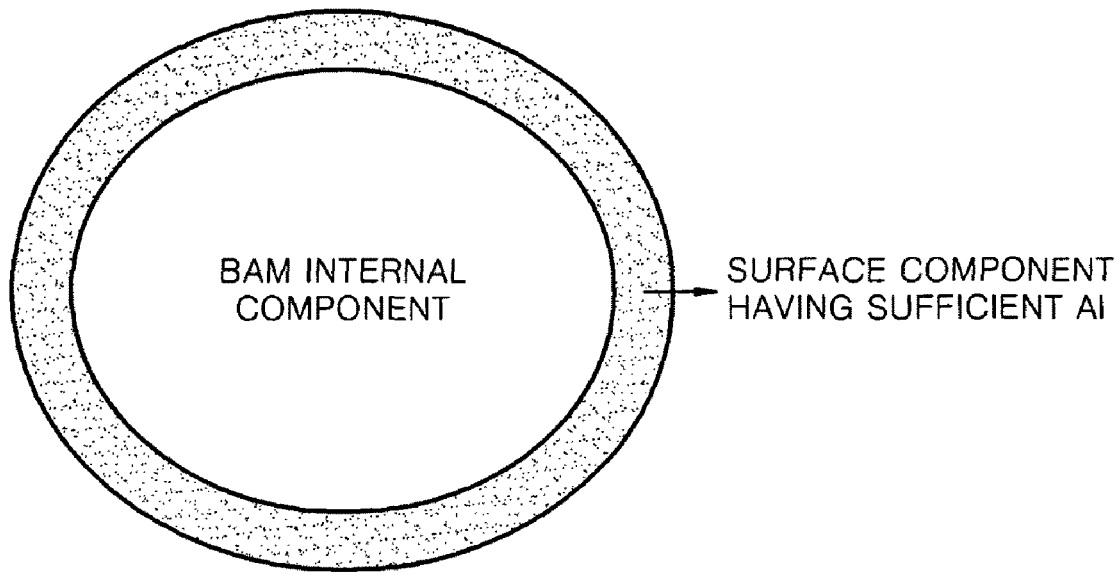
FIG. 2 illustrates a schematic cross-sectional view of a blue $BaMgAl_{10}O_{17}$:Eu (BAM) phosphor according to an embodiment.
Figure 3:
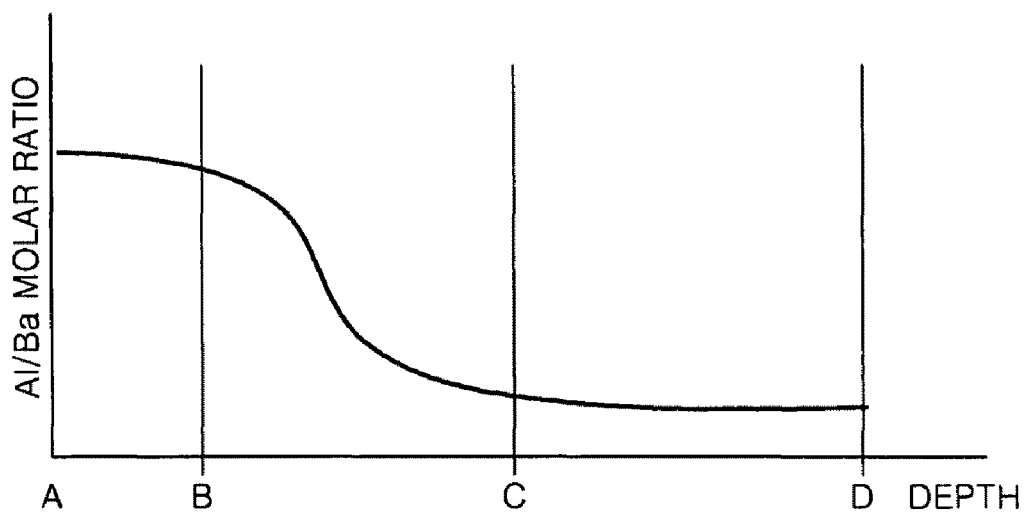
FIG. 3 illustrates a graph showing an aluminum/barium (Al/Ba) molar ratio versus a depth from a surface to a center of a blue BAM phosphor, according to an embodiment.

FIG. 2 illustrates a schematic cross-sectional view of a particle of a blue BAM phosphor according to an embodiment. FIG. 3 illustrates a graph of an Al/Ba molar ratio versus a depth from a surface to a center of a particle of a blue BAM phosphor, according to an embodiment.

Referring to FIGS. 2 and 3, a surface component of the blue BAM phosphor corresponds to an outer shaded portion in FIG. 2, and an internal component of the blue BAM phosphor corresponds to a central white portion in FIG. 2. Although a border between the surface and internal components is clearly shown in FIG. 2, the border may not actually be clear and may have a predetermined range and be continuously variable when the first and second thermal processes are performed. The border may have a large range or a small range. According to the blue BAM phosphor forming method according to an embodiment, the internal component may be formed when a first thermal process is performed on a mixture, and the surface component may be formed when a second thermal process is performed on the product of the first thermal process, thereby forming the blue BAM phosphor. An Al/Ba molar ratio according to a depth of the blue BAM phosphor may be represented as shown in the graph of FIG. 3.

Referring to FIGS. 2 and 3, the surface component of a blue BAM phosphor particle corresponds to the range A-B, the internal component of the blue BAM phosphor particle corresponds to the range C-D, and the border between the surface and internal components corresponds to a range B-C. The border may have a large range or a small range according to variations in process parameters based on the first and second thermal processes.

As described above, the Al/Ba molar ratio of the surface component may be an average Al/Ba molar ratio of a section where a variation rate of an Al/Ba molar ratio according to a depth of the blue phosphor particle is about −0.01 to about 0.01, as determined from the surface toward the center of the blue phosphor particle, in a graph of the Al/Ba molar ratio versus the depth of the blue phosphor particle, e.g., the graph of FIG. 3. In other words, the surface component may be defined as a portion where the Al/Ba molar ratio is almost constant from the surface toward the center of the blue phosphor particle.

Likewise, the Al/Ba molar ratio of the internal component may be an average Al/Ba molar ratio of a section where the variation rate of the Al/Ba molar ratio according to the depth of the blue phosphor particle is about −0.01 to about 0.01, as determined from the center toward the surface of the blue phosphor particle, in the graph of the Al/Ba molar ratio versus the depth of the blue phosphor particle, e.g., the graph of FIG. 3. In other words, the internal component may be defined as a portion where the Al/Ba molar ratio is almost constant from the center toward the surface of the blue phosphor particle.

Since the basic phosphor material that results from the first thermal process may not have good durability and stability characteristics, an Al compound may be added to and mixed with the basic phosphor material, prior to the second thermal process. Thus, when the Al compound is added and the second thermal process is performed, a portion of the added Al compound may penetrate into and be mixed with the basic phosphor material. Accordingly, the surface component (the range A-B) may have a different Al/Ba molar ratio from the internal component (range C-D), and a constant and small Al/Ba molar ratio of the internal component may change into a constant and large Al/Ba molar ratio of the surface component at the border (range B-C), e.g., where Al/Ba molar ratios may abruptly, but continuously, change.

Various blue BAM phosphors were formed by using the blue BAM phosphor forming method according to an embodiment, and thicknesses of surface components of the blue BAM phosphors were about 1 nm to about 15 nm.

The amount of Al compound added before the second thermal process may be about 0.5 weight parts to about 2 weight parts based on 100 weight parts of the basic phosphor material. Maintaining the amount of the added Al compound at about 0.5 weight parts or greater may help ensure that durability of a PDP including the phosphor is improved. Maintaining the content of the added Al compound at about 2 weight parts or less may help ensure that emission efficiency is not undesirably reduced.

The second thermal process may be performed at about 1500 to about 1600° C. for about 1 to about 10 hours. Maintaining the time and temperature of the second thermal process within the above times and temperatures may help ensure that a lattice structure is completely formed and an Al/Ba ratio in the surface component of the blue BAM phosphor is larger than the Al/Ba ratio of the internal component of the blue BAM phosphor.

The reducing atmosphere in which the second thermal process is performed may contain hydrogen gas and an inert gas, e.g., nitrogen, helium, neon, and/or argon, and mixtures thereof.

The materials on which the first thermal process is performed may be a mixture of Ba, Mg, Al, Eu, and oxygen. However, Al content of the surface component may be larger than the Al content of the internal component due to the Al compound added in the second thermal process.

A display device including a phosphor layer including a blue BAM phosphor according to an embodiment will now be described. The display device may include a FED panel, a PDP, etc. The PDP may include a transparent front substrate; a rear substrate in parallel with the front substrate; discharge cells defined by barrier ribs formed between the front and rear substrates; address electrodes which extend in one direction through the emission cells; a rear dielectric layer which covers the address electrodes; phosphor layers separately formed in the discharge cells; sustain electrode pairs which extend in a direction crossing the address electrodes; a front dielectric layer which covers the sustain electrode pairs; and discharge gas which fills the discharge cells. The structure of the PDP will now be described in detail with reference to FIG. 1.

FIG. 1 illustrates a schematic perspective view of a PDP according to an embodiment. Referring to FIG. 1, the PDP according to the current embodiment may include front and rear panels 210 and 220.

The front panel 210 may include a front substrate 211, sustain electrode pairs 214 at the rear of the front substrate 211 (e.g., on a rear surface of the front substrate 211) and extending in one direction through rows of discharge cells 226, a front dielectric layer 215 covering the sustain electrode pairs 214, and a protection layer 216.

The rear panel 220 may include a rear substrate 221 in parallel with the front substrate 211, address electrodes 222 at the front of the rear substrate 221 (more particularly, on a front surface 221a of the rear substrate 221) and extending in a direction so as to cross the sustain electrode pairs 214, a rear dielectric layer 223 covering the address electrodes 222, barrier ribs 224 between the front and rear substrates 211 and 221 (more particularly, on the rear substrate 221) and defining the discharge cells 226; and red, green, and blue phosphor layers 225a, 225b, and 225c respectively formed of red, green, and blue phosphors in the discharge cells 226 between the barrier ribs 224, and receive an ultraviolet (UV) ray emitted from the discharge gas due to a sustain discharge so as to emit visible light.

According to an embodiment, a composition containing the above-described blue BAM phosphor may be used to form the blue phosphor layer 225c.

Suitable phosphors used when a PDP is manufactured may be used in the red and green phosphor layers 225a and 225b. Examples of the red phosphor may include $(Y,Gd)BO_3$:Eu and $Y(V,P)O_4$:Eu, and examples of the green phosphor may include $Zn_2SiO_4$:Mn and $YBO_3$:Tb.

The front and rear substrates 211 and 221 may be formed of glass, and the front substrate 211 may have a high optical transmittance.

The address electrodes 222 on the front surface 221a of the rear substrate 221 and extending in a direction along the emission cells 226 may include a metal having a high electric conductivity, e.g., Al. The address electrodes 222 may be used to generate an address discharge, together with y electrodes 212 of the sustain electrode pairs 214. The address discharge may be generated in order to select a discharge cell 226 in which the sustain discharge is to be generated. The sustain discharge may be generated in the discharge cell 226 in which the address discharge is generated.

The address electrodes 222 may be covered by the rear dielectric layer 223 that protects the address electrodes 222 from being struck and damaged by charged particles. The rear dielectric layer 223 may include a dielectric material that may induce the charged particles, e.g., PbO, $B_2O_3$, or $SiO_2$.

The barrier ribs 224, which may define the discharge cells 226 may be formed between the front and rear substrate 211 and 221 so as to ensure a discharge space between the front and rear substrate 211 and 221, to prevent crosstalk between neighboring discharge cells 226, and to enlarge a surface area of a phosphor layer 225 including, e.g., the red, green, and blue phosphor layers 225a, 225b, and 225c. The barrier ribs 224 may include a glass component including an element, e.g., lead, boron, silicon, aluminum, or oxygen. If necessary, a filler, e.g., $ZrO_2$, $TiO_2$, or $Al_2O_3$, and a pigment, e.g., chromium (Cr), copper (Cu), cobalt (Co), iron (Fe), or $TiO_2$, may be included in the glass component.

The sustain electrode pairs 214 may extend in another direction along the discharge cells 226 so as to cross the address electrodes 222. The sustain electrode pairs 214 may includes pairs of x and y electrodes 213 and 212 in parallel with each other. The sustain discharge may be generated due to a potential difference between the x and y electrodes 213 and 212.

In general, each of the x electrodes 213 may include a bus electrode 213a and a transparent electrode 213b. Each of the y electrodes 212 may also include a bus electrode 212a and a transparent electrode 212b. However, in some cases, only the bus electrodes 212a and 213a instead of the transparent electrodes 212b and 213b may be included so as to function as both scanning and common electrodes.

The transparent electrodes 212b and 213b may include a conductive and transparent material that does not block light emitted from the phosphors from proceeding to the front substrate 211. A conductive and transparent material may include, e.g., indium tin oxide (ITO). However, conductive and transparent materials, e.g., ITO, may have a large resistance. Thus, if only the transparent electrodes 212b and 213b instead of the bus electrodes 212a and 213a are used as sustain electrodes, a large voltage drop may occur in a lengthwise direction of the transparent electrodes 212b and 213b such that a large amount of voltage may be required to drive the PDP, and a response speed of an image may be reduced. In order to overcome such a problem, the bus electrodes 212a and 213a, which may include a metal having a high electric conductivity, e.g., silver (Ag), may be formed on outer ends of the transparent electrodes 212b and 213b.

The sustain electrode pairs 214 may be covered by the front dielectric layer 215, which may prevent neighboring x and y electrodes 213 and 212 from being directly conducted when the sustain discharge is generated, and may protect the sustain electrode pairs 214 from being struck and damaged by the charged particles. The front dielectric layer 215 may include a dielectric material having a high optical transmittance, e.g., PbO, $B_2O_3$, and $SiO_2$.

The protection layer 216 may be formed on the front dielectric layer 215. The protection layer 216 may protect the front dielectric layer 215 from being struck and damaged by the charged particles, and may emit a large number of secondary electrons when the sustain discharge is generated. The protection layer 216 may include, e.g., MgO.

The discharge gas may fill the discharge cells 226. The discharge gas may include, e.g., a neon-xenon (Ne—Xe) gas containing about 5 to about 10% of xenon (Xe). If necessary, a portion of Ne may be replaced by He.

The PDP according to an embodiment is not limited to the PDP illustrated in FIG. 1 and may have different structures. For example, the red, green, and blue phosphor layers 225a, 225b, and 225c, which receive UV rays emitted from the discharge gas due to the sustain discharge so as to emit visible light, may be formed in a direction of the sustain electrode pairs 214.

Examples and comparative examples will now be described. Here, the examples are merely disclosed for the purpose of clearly representing the embodiments and the embodiments are not limited thereto.

EXAMPLES

Example 1

A BAM phosphor, in which an internal component has a composition of $Ba_{0.9}Eu_{0.1}MgAl_{10}O_{17}$ and a surface component has a composition of $Ba_{0.9}Eu_{0.1}MgAl_{12.1}O_{20.1}$, was formed.

BaO, MgO, $Al_2O_3$, and $Eu_2O_3$ were weighed to have a Ba:Eu:Mg:Al molar ratio of 0.9:0.1:1:10. This mixture was put into an alumina melting pot and a first thermal process was performed in an electric furnace at 1400° C. in an air atmosphere for five hours, so as to form a basic phosphor material.

Then, 0.4 times the amount of $Al_2O_3$ that was used in the first thermal process was added the basic phosphor material (which corresponded to putting 0.8 grams (g) of $Al_2O_3$ into 100 g of the basic phosphor material), and a second thermal process was performed at 1550° C. in an atmosphere of 5% of $H_2$ and 95% of $N_2$ for five hours. Thus, the BAM phosphor in which the surface component has a composition of $Ba_{0.9}Eu_{0.1}MgAl_{12.1}O_{20.1}$ was formed.

40 weight parts of the BAM phosphor, 8 weight parts of ethyl cellulose as a bonding material, and 52 weight parts of terpineol as a solvent were mixed together so as to prepare a composition for forming a blue phosphor layer.

The composition was screen-printed on a discharge cell of a PDP, dried, and baked at 480° C. so as to form the blue phosphor layer. A discharge gas in the PDP included 93 weight % of Ne and 7 weight % of Xe.

Example 2

A BAM phosphor, in which an internal component has a composition of $Ba_{0.9}Eu_{0.1}MgAl_{10}O_{17}$ and a surface component has a composition of $Ba_{0.9}Eu_{0.1}MgAl_{13.4}O_{22.1}$, was formed.

BaO, $MgCO_3$, $Al(NO_3)_3$, and $EuF_3$ were weighed to have a Ba:Eu:Mg:Al molar ratio of 0.9:0.1:1:10. Their mixture was put into an alumina melting pot and a first thermal process was performed in an electric furnace at 1350° C. in an air atmosphere for ten hours, so as to form a basic phosphor material.

Then, 0.8 times of the amount of $Al(NO_3)_3$ that was used in the first thermal process was added to the basic phosphor material (which corresponded to adding 1.6 g of $Al(NO_3)_3$ into 100 g of the basic phosphor material), and a second thermal process was performed at 1500° C. in an atmosphere of 5% of $H_2$ and 95% of $N_2$ for three hours. Thus, the BAM phosphor in which the surface component has a composition of $Ba_{0.9}Eu_{0.1}MgAl_{13.4}O_{22.1}$ was formed.

The remaining process was performed as in Example 1 so as to prepare a composition for forming a blue phosphor layer and to form the blue phosphor layer.

In Examples 1 and 2, a surface component of the BAM phosphor particle may have an Al/Ba molar ratio higher than an actual set ratio because $Al_2O_3$ or $Al(NO_3)_3$ may react on the surface component through dispersion by forming a basic phosphor material, due to the performance of the first thermal process and then adding $Al_2O_3$ or $Al(NO_3)_3$ to the basic phosphor material.

Comparative Example 1

BaO, MgO, $Al_2O_3$, and $Eu_2O_3$ were mixed together so as to have a composition of $Ba_{0.9}Eu_{0.1}MgAl_{10}O_{17}$. This mixture was put into an alumina melting pot and a first thermal process was performed in an electric furnace at 1400° C. in an air atmosphere for five hours, so as to form a basic phosphor material.

Then, a second thermal process was performed at 1550° C. in an atmosphere of 5% of $H_2$ and 95% of $N_2$ for five hours, without adding an Al compound to the basic phosphor material.

The remaining process was performed as in Example 1 so as to prepare a composition for forming a blue phosphor layer, and to form the blue phosphor layer.

Comparative Example 2

BaO, MgO, $Al_2O_3$, and $Eu_2O_3$ were weighed to have a Ba:Eu:Mg:Al molar ratio of 0.9:0.1:1:10. $Al_2O_3$ corresponding to a molar ratio 9.8 out of the molar ratio 10 of Al was mixed with the other components and the remaining 0.2 was set aside. The mixture was put into an alumina melting pot and a first thermal process was performed in an electric furnace at 1400° C. in an air atmosphere for five hours, so as to form a basic phosphor material.

Then, $Al_2O_3$ corresponding to the remaining molar ratio 0.2 of Al was added to the basic phosphor material and a second thermal process was performed at 1550° C. in an atmosphere of 5% of $H_2$ and 95% of $N_2$ for five hours.

The remaining process was performed as in Example 1 so as to prepare a composition for forming a blue phosphor layer, and to form the blue phosphor layer.

Comparative Example 3

BaO, MgO, $Al_2O_3$, and $Eu_2O_3$ were weighed to have a Ba:Eu:Mg:Al molar ratio of 0.9:0.1:1:10. $Al_2O_3$ corresponding to a molar ratio 9.6 out of the molar ratio 10 of Al was mixed with the other components and the remaining 0.4 was set aside. The mixture was put into an alumina melting pot and a first thermal process was performed in an electric furnace at 1400° C. in an air atmosphere for five hours, so as to form a basic phosphor material.

Then, $Al_2O_3$ corresponding to the remaining molar ratio 0.4 of Al was added to the basic phosphor material and a second thermal process was performed at 1550° C. in an atmosphere of 5% of $H_2$ and 95% of $N_2$ for five hours.

The remaining process was performed as in Example 1 so as to prepare a composition for forming a blue phosphor layer, and to form the blue phosphor layer.

Comparative Example 4

$BaCO_3$, MgO, $Al_2O_3$, and $Eu_2O_3$ were mixed together so as to have a composition of $Ba_{0.9}Eu_{0.1}MgAl_{10}O_{17}$. This mixture was put into an alumina melting pot and a thermal process was performed at 1500° C. in an atmosphere of 5% of $H_2$ and 95% of $N_2$ for five hours, so as to form a BAM phosphor.

Then, 0.1 weight % of $Al_2O_3$ (based on the weight of the BAM phosphor) was coated on the BAM phosphor, without a second thermal process.

The remaining process was performed as in Example 1 so as to prepare a composition for forming a blue phosphor layer, and to form the blue phosphor layer.

Comparative Example 5

The process of Comparative Example 4 was performed except that 0.2 weight % of $Al_2O_3$ (based on the weight of a BAM phosphor) was coated on the BAM phosphor, without a second thermal process.

Comparative Example 6

The process of Comparative Example 4 was performed except that 2 weight % of $Al_2O_3$ (based on the weight of a BAM phosphor) was coated on the BAM phosphor, without a second thermal process.

Surface and internal components according to Examples 1 and 2 and Comparative Examples 1 through 6 were analyzed by using an inductively coupled plasma (ICP) method.

ICP Analysis

Analysis results of the BAM phosphors prepared according to Examples 1 and 2 and Comparative Examples 1 through 6 are shown in Table 1 of FIG. 7. Each internal component of the BAM phosphors prepared according to Examples 1 and 2 and Comparative Examples 1 through 6 was analyzed by using the ICP method after a surface and border components were removed by dissolving the BAM phosphor in a solution of 5 milliliter (ml) of 9 M nitric acid and 10 ml of 25 M hydrofluoric acid for an hour or more, and then the remaining phosphor was dissolved for twenty four hours. Each surface component of the BAM phosphors prepared according to Examples 1 and 2 and Comparative Examples 1 through 6 was analyzed by using the ICP method after a BAM phosphor was dissolved in a solution of 5 ml of 9 M nitric acid and 10 ml of 25 M hydrofluoric acid for 30 minutes or less.

Each value measured in parts per million (ppm) was converted into a molar ratio so as to be represented in Table 1. A color coordinate and luminance of a full blue color in a 42 inch high definition (HD) panel was measured and a relative efficiency (%) was represented by using an L/y value that was obtained by dividing the luminance by a y coordinate of the color coordinate according to the International Commission on Illumination (CIE). Durability was obtained by comparing an initial efficiency to the efficiency after 1,000 hours.

As shown in Table 1, each of the BAM phosphors according to Examples 1 and 2 was formed by preparing a mixture at a Ba:Eu:Mg:Al molar ratio of 0.9:0.1:1:10 in a first process and adding an Al compound in a second process. Each of the BAM phosphors according to the Comparative Examples 1 through 3 was formed when the Al compound used in both of the first and second processes has a Ba:Eu:Mg:Al molar ratio of 0.9:0.1:1:10. That is, when Examples 1 and 2 are compared to Comparative Examples 1 through 3, a BAM phosphor according to an embodiment may be formed by adding an excess of the Al compound into the mixture, instead of separately putting a fixed amount of the Al compound into the mixture. The durability and the relative efficiency according to Examples 1 and 2 are superior to those according to Comparative Examples 1 through 3.

When Comparative Examples 4 through 6 according to a typical $Al_2O_3$ coating method are compared to Examples 1 and 2, it is also clear that Examples 1 and 2 exhibit superior properties. Also, when Examples 1 and 2 are compared to Comparative Example 6 in which an amount of $Al_2O_3$ to be coated is increased so as to have a similar difference between Al/Ba molar ratios of surface and internal components in comparison to Examples 1 and 2, the durability and the relative efficiency of the PDP and phosphor prepared according to Comparative Example 6 are inferior to those prepared according to Examples 1 and 2.

Figure 4:
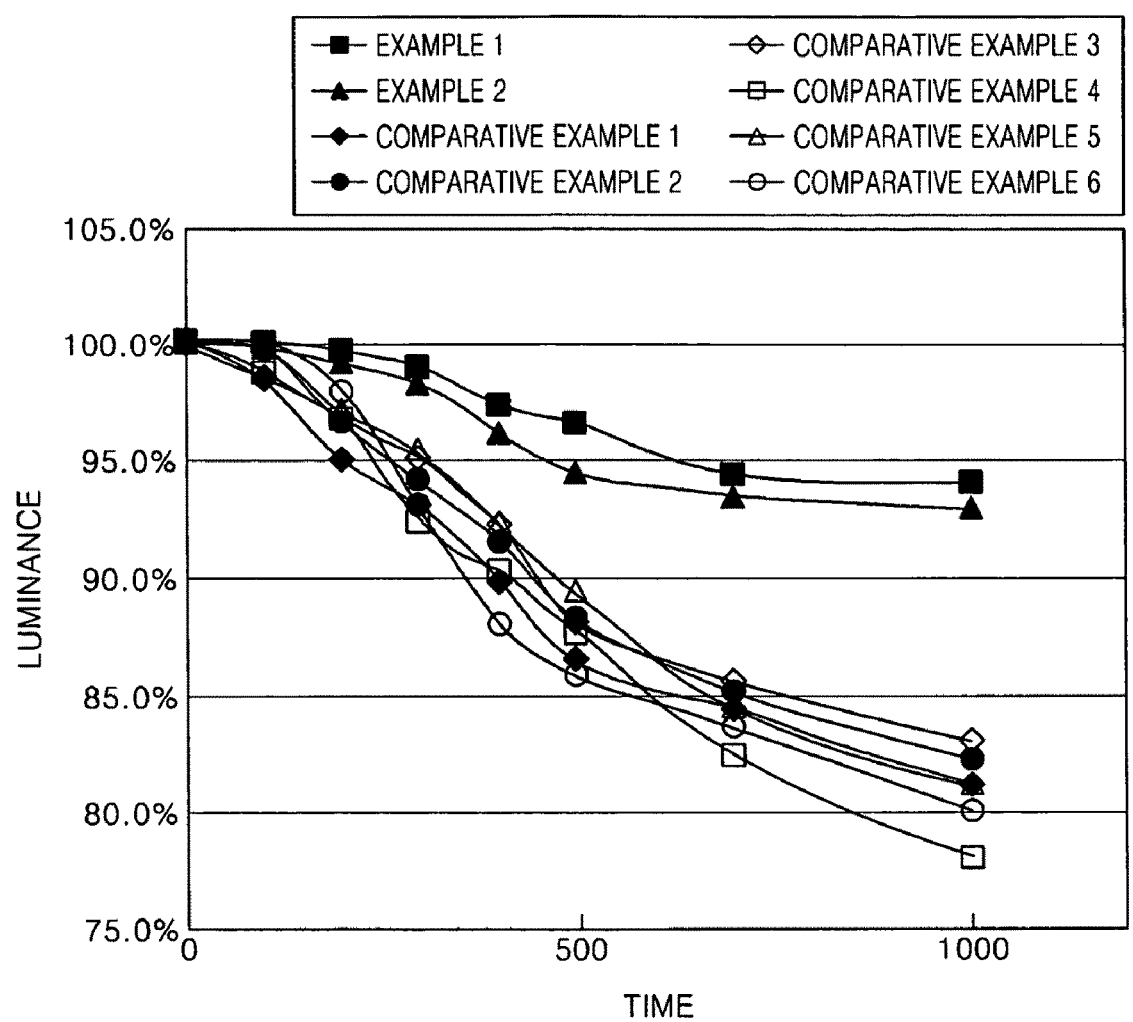
FIG. 4 illustrates a graph showing durability of BAM phosphors prepared according to Examples 1 and 2 and Comparative Examples 1 through 6.

FIG. 4 illustrates a graph showing the durability of the BAM phosphors according to Examples 1 and 2 and Comparative Examples 1 through 6. In FIG. 4, it is clearly shown that the durability of the phosphors prepared according to Examples 1 and 2 is superior to that of the phosphors prepared according to Comparative Examples 1 through 6.

In Comparative Examples 4 through 6, corresponding to a general $Al_2O_3$ coating method, Ba is detected on a surface of a BAM phosphor particle because the $Al_2O_3$ is not continuously coated on the surface and is, in most cases, coated in an island type pattern.

Figure 5A:
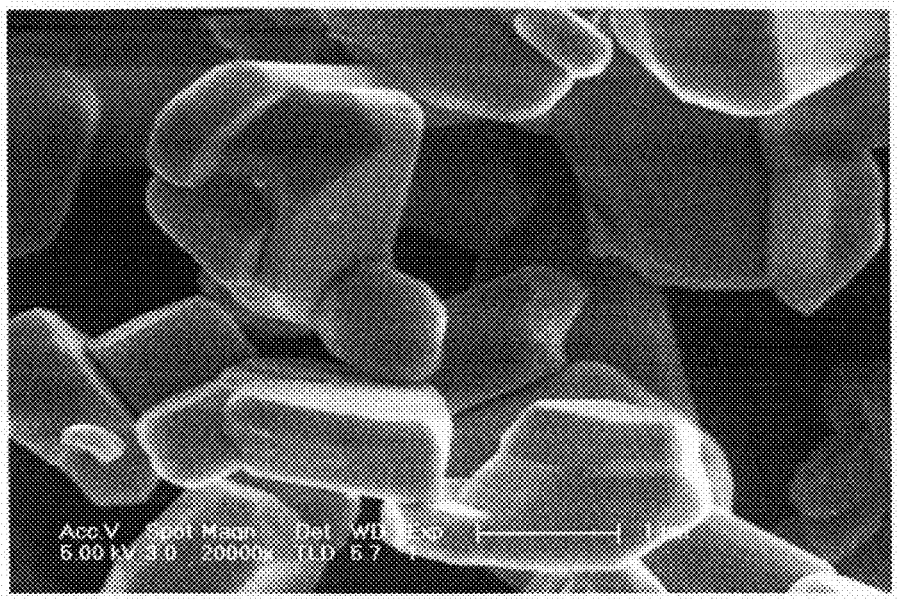
FIGS. 5A and 5B respectively illustrate scanning electron microscopic (SEM) images of surfaces of BAM phosphors prepared according to Example 1 and Comparative Example 6.
Figure 5B:
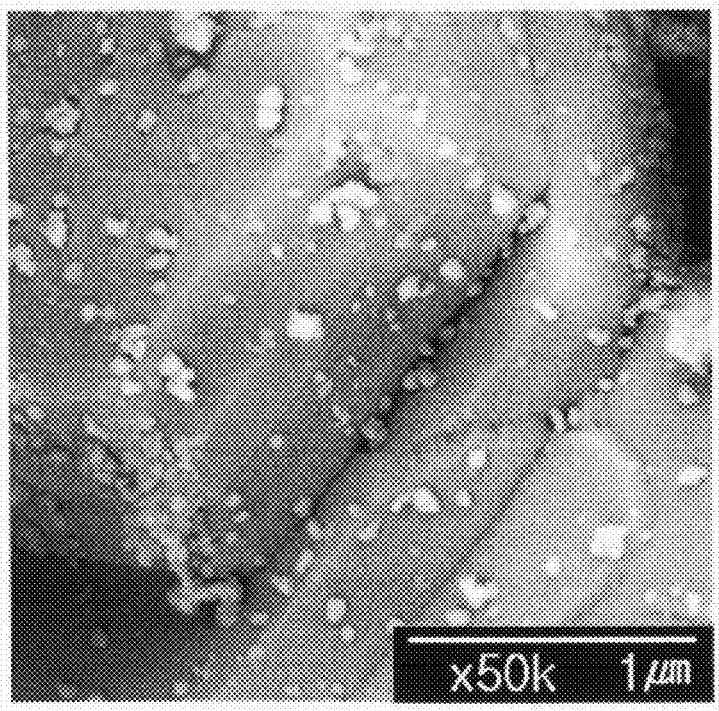

The BAM phosphors prepared according to Example 1 and Comparative Example 6, which have similar Al/Ba molar ratios between surface and internal components, will now be compared to each other. FIGS. 5A and 5B respectively illustrate scanning electron microscopic (SEM) images of surfaces of the BAM phosphors prepared according to Example 1 and Comparative Example 6. Referring to FIG. 5A, the BAM phosphor prepared according to Example 1 has a smooth, uniform surface. Referring to FIG. 5B, the BAM phosphor prepared according to Comparative Example 6 has $Al_2O_3$ on the exterior surface in an island-type pattern.

Figure 6A:
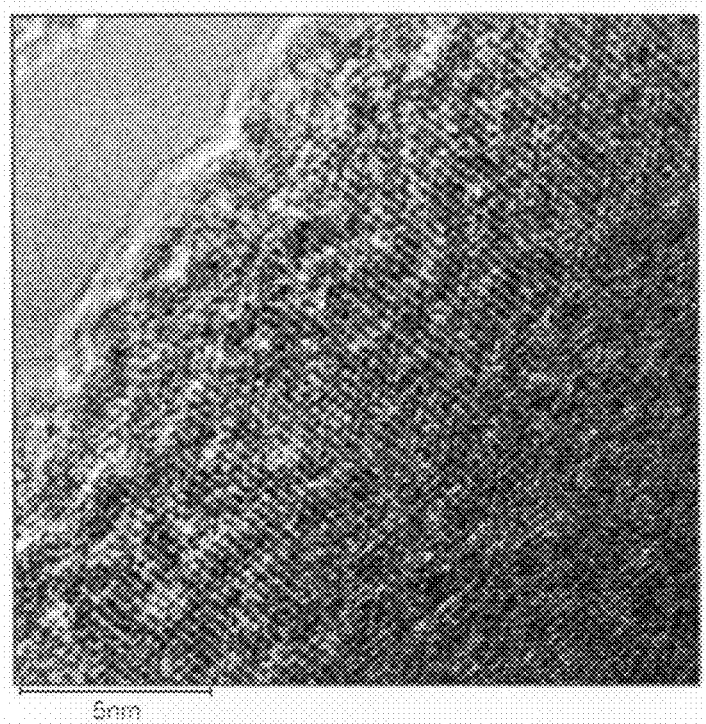
FIGS. 6A and 6B respectively illustrate transmission electron microscopic (TEM) images of BAM phosphors prepared according to Example 1 and Comparative Example 6.
Figure 6B:
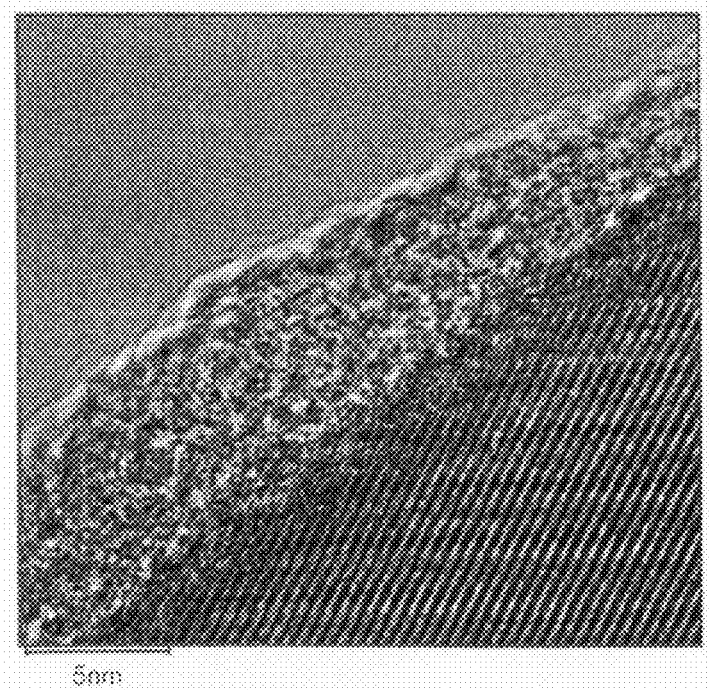

FIGS. 6A and 6B respectively illustrate transmission electron microscopic (TEM) images of the BAM phosphors prepared according to Example 1 and Comparative Example 6. Referring to FIG. 6A, the phosphor prepared according to Example 1 exhibits a continuously variable difference between the internal component and surface component of the particle. Referring to FIG. 6B, the phosphor prepared according to Comparative Example 6 exhibits an $Al_2O_3$ layer layered discontinuously on the surface of the phosphor particle.

Blue phosphors for a PDP may include, e.g., $BaMgAl_{10}O_{17}$:Eu (BAM) phosphor. The BAM phosphor may exhibit undesirable luminance reduction and a color coordinate change during thermal processing of the PDP, and may also have luminance reduction and dispersion between PDPs due to instability caused by long time projection of VUV rays, undesirably reducing durability of the PDP. Also, the BAM phosphor may reduce the durability of the PDP due to its short operating lifespan. In contrast, the blue phosphor of an embodiment may improve durability of a PDP and may be stable during a thermal process of a PDP.

BAM phosphors may be mixed with a $CaMaSi_2O_6$:Eu (CMS) phosphor having excellent durability characteristics. However, undesirable efficiency reduction and a discharge problem may occur due to low emission efficiency and negative surface charge characteristics of the CMS phosphor. Also, mixed phosphors may be very difficult to process. In contrast, the blue BAM phosphor according to an embodiment, a particle of which may have surface and internal components having different Al/Ba molar ratios such that the surface component contains a larger amount of Al than the internal component, may be stable during thermal processing of the PDP. Accordingly, a BAM phosphor having excellent optical characteristics as well as little or no process deterioration and durability problems may be provided. A new composition of BAM phosphor according to an embodiment, with low process deterioration and high durability against VUV rays, may improve brightness and durability of next generation PDPs.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A blue phosphor, comprising:
   $BaMgAl_{10}O_{17}$:Eu (BAM) phosphor particles having a surface component and an internal component, wherein an aluminum/barium (Al/Ba) molar ratio of the surface component of the phosphor particles is 1.1 to about 1.4 times the Al/Ba molar ratio of the internal component of the phosphor particles, and the Al/Ba molar ratios are continuously variable between the internal component and the surface component, wherein:

the Al/Ba molar ratio of the surface component is an average Al/Ba molar ratio of a section where a variation rate of an Al/Ba molar ratio according to a depth of the phosphor particle is about −0.01 to about 0.01, as determined from a surface toward a center of the phosphor particle, and the Al/Ba molar ratio of the internal component is an average Al/Ba molar ratio of a section where the variation rate of the Al/Ba molar ratio according to the depth of the phosphor particle is about −0.01 to about 0.01, as determined from the center toward the surface of the phosphor particle.

2. The blue phosphor as claimed in claim 1, wherein the Al/Ba molar ratio of the surface component is about 13:1 to about 16:1, and the Al/Ba molar ratio of the internal component is about 11:1 to about 12:1.

3. A display device, comprising:

a phosphor layer including a blue phosphor including $BaMgAl_{10}O_{17}$:Eu (BAM) phosphor particles having a surface component and an internal component, wherein an aluminum/barium (Al/Ba) molar ratio of the surface component of the phosphor particles is 1.1 to about 1.4 times the Al/Ba molar ratio of the internal component of the phosphor particles, and the Al/Ba molar ratios are continuously variable between the internal component and the surface component.

4. A method of forming a blue phosphor, comprising:

performing a first thermal process on a mixture of a barium compound, a magnesium compound, a first aluminum compound, and a europium compound in an air atmosphere so as to form a basic phosphor material, adding a second aluminum compound to the basic phosphor material so as to form a basic phosphor material/aluminum compound adduct, and performing a second thermal process on the basic phosphor material/aluminum compound adduct in a reducing atmosphere so as to form phosphor particles having a surface component and an internal component, wherein an aluminum/barium (Al/Ba) molar ratio of the surface component of the phosphor particles is 1.1 to about 1.4 times the Al/Ba molar ratio of the internal component of the phosphor particles.

5. The method as claimed in claim 4, wherein the barium compound includes at least one of barium carbonate ($BaCO_3$) and barium oxide (BaO).

6. The method as claimed in claim 4, wherein the magnesium compound includes at least one of magnesium oxide (MgO) and magnesium carbonate ($MgCO_3$).

7. The method as claimed in claim 4, wherein the first and second aluminum compounds include at least one of aluminum oxide ($Al_2O_3$) and aluminum nitrate ($Al(NO_3)_3$).

8. The method as claimed in claim 4, wherein the europium compound includes at least one of europium oxide ($Eu_2O_3$), europium fluoride ($EuF_3$), and europium chloride ($EuCl_3$).

9. The method as claimed in claim 4, wherein the mixture has a barium:magnesium:aluminum:oxygen (Ba:Mg:Al:O) ratio of about 0.9-1.1:0.9-1.1:9-10:16-18, based on 0.1 mol of Eu.

10. The method as claimed in claim 4, wherein the first thermal process is performed at about 1350 to about 1450° C.

11. The method as claimed in claim 10, wherein the first thermal process is performed for about 1 to about 10 hours.

12. The method as claimed in claim 4, wherein the second aluminum compound is added in an amount of about 0.5 to about 2 weight parts, based on 100 weight parts of the basic phosphor material.

13. The method as claimed in claim 10, wherein the second thermal process is performed at about 1500 to about 1600° C.

14. The method as claimed in claim 13, wherein the second thermal process is performed for about 1 to about 10 hours.

15. The method as claimed in claim 4, wherein the reducing atmosphere includes hydrogen gas and at least one of, nitrogen gas, helium gas, neon gas, and argon gas.

16. A display device, comprising:

a phosphor layer including a blue phosphor including $BaMgAl_{10}O_{17}$:Eu (BAM) phosphor particles having a surface component and an internal component, wherein an aluminum/barium (Al/Ba) molar ratio of the surface component of the phosphor particles is 1.1 to about 1.4 times the Al/Ba molar ratio of the internal component of the phosphor particles, and the Al/Ba molar ratios are continuously variable between the internal component and the surface component, wherein:

the Al/Ba molar ratio of the surface component is an average Al/Ba molar ratio of a section where a variation rate of an Al/Ba molar ratio according to a depth of the phosphor particle is about −0.01 to about 0.01, as determined from a surface toward a center of the phosphor particle, and the Al/Ba molar ratio of the internal component is an average Al/Ba molar ratio of a section where the variation rate of the Al/Ba molar ratio according to the depth of the phosphor particle is about −0.01 to about 0.01, as determined from the center toward the surface of the phosphor particle.

* * * * *